United States Patent
Mukai et al.

[11] Patent Number: 6,126,450
[45] Date of Patent: Oct. 3, 2000

[54] MEDICAL SIMULATOR SYSTEM AND MEDICAL SIMULATOR NOTIFYING APPARATUS

[75] Inventors: Nobuhiko Mukai; Masayuki Harada; Katsunobu Muroi, all of Tokyo, Japan

[73] Assignee: Mitsubishi Denki Kabushiki Kaisha, Tokyo, Japan

[21] Appl. No.: 09/243,806

[22] Filed: Feb. 3, 1999

[30] Foreign Application Priority Data

Feb. 4, 1998 [JP] Japan .................................. 10-023229
Feb. 19, 1998 [JP] Japan .................................. 10-037383

[51] Int. Cl.[7] .................................................. G09B 23/28
[52] U.S. Cl. ..................... 434/262; 434/272; 434/307 R; 600/130
[58] Field of Search ..................................... 434/118, 256, 434/262, 270, 271, 307 R, 308, 309, 365, 268, 272, 267; 340/407.1; 345/473; 600/587, 109, 443, 921, 101, 118, 424, 427, 130; 606/1, 45, 174; 128/916, 653.1; 348/58, 78; 703/6

[56] References Cited

U.S. PATENT DOCUMENTS

| | | | |
|---|---|---|---|
| 4,907,973 | 3/1990 | Hon . | |
| 5,217,003 | 6/1993 | Wilk | 600/109 |
| 5,320,538 | 6/1994 | Baum | 434/307 R |
| 5,495,576 | 2/1996 | Ritchey | 395/125 |
| 5,546,943 | 8/1996 | Gould | 128/653.1 |
| 5,631,973 | 5/1997 | Green | 382/128 |
| 5,704,791 | 1/1998 | Gillio | 434/262 |
| 5,766,016 | 6/1998 | Sinclair et al. | 434/262 |
| 5,769,640 | 6/1998 | Jacobus et al. | 434/262 |
| 5,791,907 | 8/1998 | Ramshaw et al. | 434/262 |
| 5,817,022 | 10/1998 | Vesely | 600/443 |
| 5,909,380 | 6/1999 | Dubois et al. | 351/205 |
| 5,947,743 | 9/1999 | Hasson | 434/262 |
| 6,062,865 | 5/2000 | Bailey | 434/262 |

FOREIGN PATENT DOCUMENTS 5123327 5/1993 Japan .

OTHER PUBLICATIONS

"Virtual Environment Display System" by Fisher et al, ACM 1986 Workshop on Interactive 3D Graphics, p. 1–11, Oct. 1986.

Primary Examiner—Joe H. Cheng

[57] ABSTRACT

In a medical simulator system, a physical model such as a medical phantom is no longer required so as to execute a simulated medical treatment. The medical simulator system is arranged by storage means for storing thereinto virtual model information and medical information, the virtual model information virtually constituting one of a portion of a human body, an entire human body, a portion of an animal, and an overall animal, whereas the medical information being directed to a medical treatment selected from an operation, an examination, and an experiment; a simulated medical instrument made by simulating a medical instrument used in the medical treatment; control means for controlling a condition of a simulated medical treatment which is virtually carried out by using the simulated medical instrument while using the virtual model information and the medical information stored in the storage means with respect to the simulated medical treatment virtually executed by the operator; and notifying means for notifying information acquired by the control means to the operator.

17 Claims, 11 Drawing Sheets

FIG. 2

| 1000 | 100 |
|---|---|
| (X1,Y1,Z1),(L1,M1,N1),(R1,G1,B1) | (X1,Y1,Z1),(L1,M1,N1),(R1,G1,B1) |
| (X2,Y2,Z2),(L2,M2,N2),(R2,G2,B2) | (X2,Y2,Z2),(L2,M2,N2),(R2,G2,B2) |
| ⋮ | ⋮ |
| ⋮ | ⋮ |
| (X1000,Y1000,Z1000),(L1000,M1000,N1000),(R1000,G1000,B1000) | (X100,Y100,Z100),(L100,M100,N100),(R100,G100,B100) |
| 4000 | 400 |
| (1,2,3) | (1,2,3) |
| (2,3,4) | (2,3,4) |
| ⋮ | ⋮ |
| ⋮ | ⋮ |
| (A4000,B4000,C4000) | (A400,B400,C400) |

| 300 | 301 |
|---|---|
| SYMPTOM IS CATARACT | BLEEDING OCCURS IN CONJUNCTIVA INCISION |
| HARDNESS OF NUCLEUS LENS IS GRADE OF 2 | BLEEDING OF 1ml/S OCCURS IN CONJUNCTIVA |
| IN GRADE OF 2, NUCLEUS CAN BE DESTROYED BY FORCE OF 1.0 KG | BLEEDING CAN BE STOPPED BY ELECTROCAUTERY |
| RIGHT VISION IS 0.1, LEFT VISION IS 0.2 | WHEN CORNEA IS INCISED, PORT IS MADE |
| NO COMPLICATION | NUCLEUS LENS CAN BE DESTROYED AFTER INCISING ANTERIOR CAPSULE |
| PALPEBRAE IS RELATIVELY LARGE | WHEN PHACO IS TOO CLOSE TO POSTERIOR, CAPSULE, POSTERIOR CAPSULE IS DAMAGED |
| TWO HAND METHOD BY PHACO IS BEST | . . . . |
| . . . . | . . . . |
| . . . . | . . . . |
| . . . . | . . . . |
| . . . . | . . . . |
| . . . . | . . . . |

FIG. 4

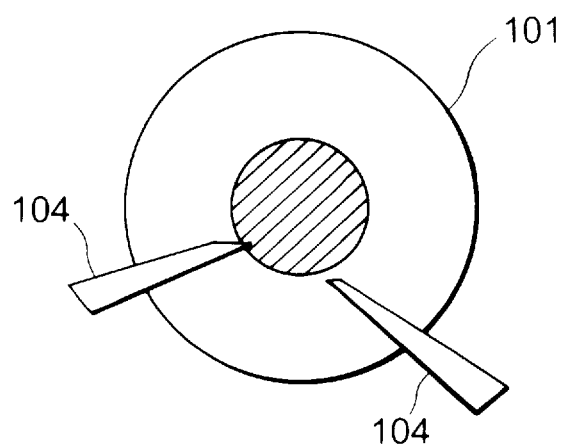

| | |
|---|---|
| 1) | APPLY ANESTHESIA |
| 2) | SET EYE SPECULUM |
| 3) | INCISE CONJUNCTIVA |
| 4) | SET CONTROL THREAD |
| 5) | INCISE CORNEA |
| 6) | INCISE ANTERIOR CAPSULE |
| 7) | DELIVER NUCLEUS LENS |
| 8) | POLISH POSTERIOR CAPSULE |
| 9) | INSERT INTRAOCULAR LENS |
| 10) | SUTURE |

FIG. 11

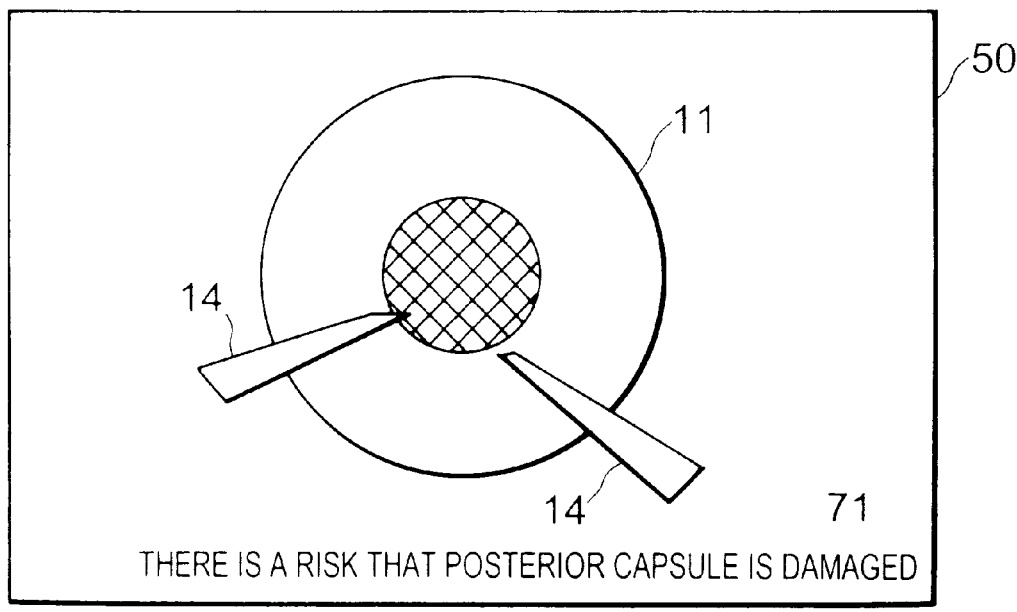

THERE IS A RISK THAT POSTERIOR CAPSULE IS DAMAGED

FIG. 12

| |
|---|
| NUCLEUS LENS IS DENSELY WOUNDED UNLESS HEMOSTASIS IS CARRIED OUT WITHIN 30 SECONDS |
| IF INCISED PORT IS TOO SMALL, THEN INSTRUMENT CANNOT BE INSERTED |
| WHEN INSTRUMENT IS APPROACHED TOO CLOSE TO POSTERIOR CAPSULE, POSTERIOR CAPSULE IS DAMAGED |
| WHEN POSTERIOR CAPSULE IS DAMAGED, VITREOUS BODY COMES OUT |
| CRACK IS PRODUCED UNLESS INTRAOCULAR LENS IS WARMED |

FIG. 13

| |
|---|
| SIMULATED MEDICAL TREATMENT : CATARACT OPERATION |
| SIMULATED OPERATION TIME : 50 MINUTES |
| NO COMPLICATION. NOTE : THERE IS A RISK THAT POSTERIOR CAPSULE IS DAMAGED |
| INCISED PORT : 5 mm |
| CRACK IS PRODUCED ON INTRAOCULAR LENS. IT IS REQUITED TO HOLD LENS WITH KEEPING WARM |
| OVERVIEW : NO COMPLICATION OCCURED. OPERATION SUCCEED ED. HOWEVER, CRACK WAS MADE ON LENS,THIS CAUSE MAY BE UNDERSTOOD FROM SUCH A FACT THAT OPERATION TIME IS PROLONGED AND ALSO LENS WAS NOT HELD WITH KEEPING WARM,TRAINING OF NUCLEUS LENS DIVISION IS REQUIRED SO AS TO SHORTEN OPERATION TIME |

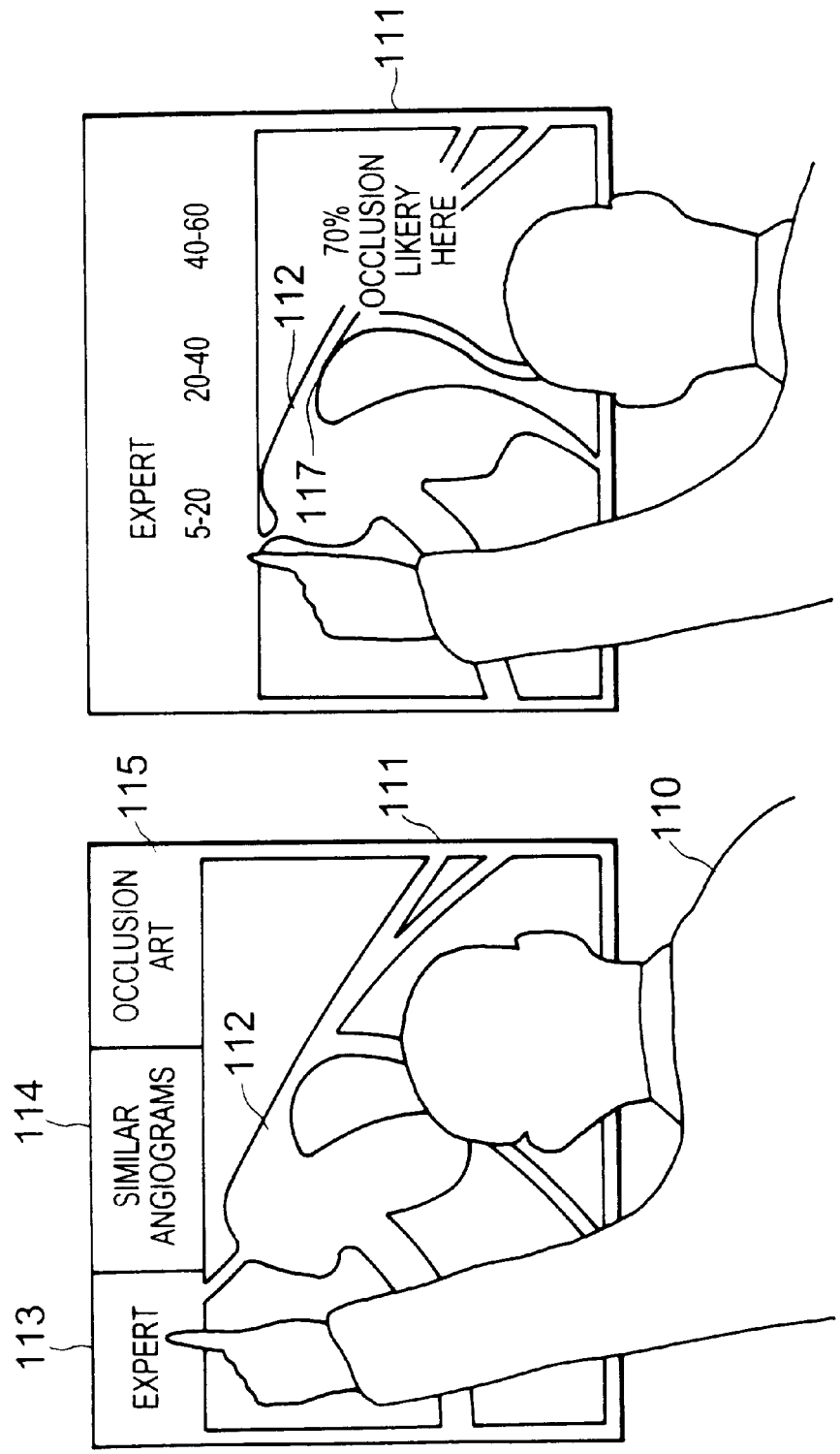

MEDICAL SIMULATOR SYSTEM AND MEDICAL SIMULATOR NOTIFYING APPARATUS

BACKGROUND OF THE INVENTION

1. Field of the Invention

The present invention generally relates to a medical simulator system and a notifying apparatus used in such a medical simulator. More specifically, the present invention is directed to such a medical simulator system operable without requiring physical models, or medical phantoms, and also such a notifying apparatus used in this medical simulator system, capable of notifying sufficient information to help in a simulated medical treatment.

2. Description of the Related Art

Conventionally, various medical simulator systems are proposed in the medical field. FIG. 15 illustratively shows the first conventional simulator system disclosed in U.S. Pat. No. 4,907,973. In this simulator system, reference numeral 750 indicates a simulated endoscope, reference numeral 751 shows a model (medical phantom), and reference numeral 751a represents a tip portion of the simulated endoscope. Also, reference numeral 752 indicates a computer, reference numeral 752b shows a transmission coupling units, reference numeral 752c represents another transfer coupling unit, reference numeral 753 is a storage apparatus, reference numeral 753a shows another transmission coupling units, reference numeral 754 shows a video display apparatus, reference numeral 755 denotes an operator, reference numeral 756 represents the manipulation of the operator's hand, and reference numeral 757 shows the resultant image.

Now, the operation of the above-described first medical simulator system will be described.

The simulated endoscope 750 is inserted into the model 751 by the operator 755. A plurality of sensors are set within the model 751. These sensors sense the position of the tip portion 751a of the simulated endoscope 750 to transmit the signal thereof via the transmission coupling unit 752b to the computer 752. While the computer 752 accesses to the storage apparatus 753 via the transmission coupling unit 752c, this computer 752 receives the electric signal indicative of the scene. This scene is observed from the relative position of the tip portion 751a of the simulated endoscope 750 while manipulating this simulated endoscope 750 by the operator 755.

Since motion of the tip portion 751a of the simulated endoscope 750 is sensed by the sensors, the images are changed on the screen of the video display apparatus 754 in response to the motion of the tip portion 751a of this simulated endoscope 750. When such an one operation cycle defined from the manipulation 756 of the operator 755 up to the resultant image 757 is accomplished in this manner, and another operation cycle is then newly carried out, new images are immediately changed. At this time, the computer 752 can interpret various conditions in response to motion of the simulated endoscope 750 so as to exactly represent such images that may be observed by the actual operations.

FIG. 16a and FIG. 16b illustratively show the display methods in the second conventional medical simulator system disclosed in U.S. Pat. No. 4,907,973. This display system corresponds to the interactive system between the operator and the display so as to solve the various problems of a patient. In the drawings, reference numeral 110 shows an operator, reference numeral 111 indicates a display, reference numeral 112 is the scene in the patient's body indicated on the display 111, and reference numeral 113 represents the "EXPERT" category. Also, reference numeral 114 is the "SIMILAR ANGIOGRAMS" category, reference numeral 115 shows the "OCCLUSION ART" category, and reference numeral 117 indicates the position corresponding to the scene 112 in the patient's body.

Next, operations of the above-explained second conventional medical simulator system will now be explained.

During a medical examination, the scene 112 in the patient's body is indicated on the display 111 provided to the operator 110. Three different categories are represented on the upper portion of this display 111. That is, the "EXPERT" category 113, the "SIMILAR ANGIOGRAMS" category 114, and the "OCCLUSION ART" category 115 are represented on the display 111, and are selectable by the operator 110. It should be understood that although only three categories are represented herein, more than three categories may be produced and some categories may be displayed depending upon medical instruments and medical regions of interest.

When one of the above-described three different categories indicated on the display 111 is selected, the system storage is accessed to provide the necessary information. FIG. 16b represents the information provided in response to the display condition in the case where the "EXPERT" category 113 is selected. While the basic scene in the patient's body is continuously indicated on the display 111, the current information displayed on the upper portion of this display screen is changed to further information related to the "EXPERT" category 113 selected by the operator. Then, the computer retrieves the data concerning the display information of the "EXPERT" category 113, and may conclude that the probability of "OCCLUSION" becomes 70% at a certain position 117.

The first conventional medical simulator system required physical models when simulating manipulation for medical treatments is carried out. Therefore, there was a problem in which such physical models must be made for simulated medical treatments directed to training, practices, or experiments. In addition, in the above-described conventional one, a video display apparatus notified an operator of the conditions of the simulated motion, so that there occurred a problem that such a display means as a video display apparatus was always required. Also, a significant problem with respect to a system has arisen that, for instance, when the operator is blind, he/she may not use such a medical simulator system.

The display system according to the second conventional medical simulator system made it possible to select some desired categories out of a plurality of menus and to express the potential of lesion portions by the probability. However, when such medical treatments as operations, examinations, or experiments are simulated, many of the operators of interest are usually beginners. Therefore, there was also a problem that information sufficient to help the training, practices, or experiments for the simulated medical treatments was not provided in accordance with the conditions.

SUMMARY OF THE INVENTION

The present invention has been made in order to overcome the above-noted problems, and an object thereof is to provide a medical simulator system in which no physical model is required for each simulated medical treatment of interest, and in which no display means is always required.

Also, the present invention has been made in order to overcome the above-noted problems, and another object thereof is to provide a medical simulator notifying apparatus in which information sufficient to help the training, practices, or experiments for the simulated medical treatments of interest may be provided in accordance with the conditions.

In order to achieve the above object, according to one aspect of the present invention, there is provided a medical simulator system which comprises storage means for storing thereinto virtual model information and medical information, the virtual model information virtually constituting one of a portion of a human body, an entire human body, a portion of an animal, and an overall animal, whereas the medical information being directed to a medical treatment selected from an operation, an examination, and an experiment, a simulated medical instrument made by simulating a medical instrument used in the medical treatment, control means for controlling a condition of a simulated medical treatment which is virtually carried out by an operator by using the simulated medical instrument while using the virtual model information and the medical information stored in the storage means with respect to the simulated medical treatment virtually executed by the operator, and notifying means for notifying information acquired by the control means to the operator.

According to another aspect of the present invention, there is provided a medical simulator system, wherein the control means executes a contact detection between the virtual model information and the simulated medical instrument to thereby realize the simulated medical treatment in accordance with the result of the contact detection and the medical information.

According to still another aspect of the present invention, there is provided a medical simulator system, wherein the information stored in the storage means is constructed of three-dimensional graphical shape information of one of the human body and the animal, which virtually constitutes one of a partial shape of the human body, an overall shape thereof, a partial shape of the animal, and an overall shape thereof by using three-dimensional graphics, three-dimensional graphical shape information of the simulated medical instrument, which virtually constitutes a shape of the simulated medical instrument by using three-dimensional graphics, and condition change information for describing both symptom information and a change in symptom, the symptom information describing symptom of one of the human body and the animal, which are treated as to the simulated medical treatment, and the change in the symptom occurring in the case that the simulated medical treatment is carried out with respect to one of the human body and the animal, which are treated as to the simulated medical treatment.

According to a further aspect of the present invention, there is provided a medical simulator system, which has a simulation operation selector for selecting a desired simulated medical treatment from a plurality of virtual simulated medical treatments.

According to a still further aspect of the present invention, there is provided a medical simulator system, wherein the notifying means is a display means for performing a visual sense feedback.

According to another aspect of the present invention, there is provided a medical simulator system, wherein the notifying means is a tactile sense representing means for performing a tactile sense feedback.

According to still another aspect of the present invention, there is provided a medical simulator system, wherein the notifying means is speech output means for performing a hearing feedback.

According to a further aspect of the present invention, there is provided a medical simulator system, wherein the simulated medical instrument is constituted by plural sets of simulated medical instruments corresponding to a plurality of operators.

According to a still further aspect of the present invention, there is provided a medical simulator system, wherein the display means is constituted by a plurality of display means.

According to another aspect of the present invention, there is provided a medical simulator system, wherein the tactile sense representing means is constituted by a plurality of tactile sense representing means.

According to still another aspect of the present invention, there is provided a medical simulator system, wherein the speech output means is constituted by a plurality of speech output means.

According to a further aspect of the present invention, there is provided a medical simulator notifying apparatus which comprises storage means for storing thereinto virtual model information and medical information, the virtual model information virtually constituting one of a portion of a human body, an entire human body, a portion of an animal, and an overall animal, whereas the medical information being directed to a medical treatment selected from an operation, an examination, and an experiment, a simulated medical instrument made by simulating a medical instrument used in the medical treatment, control means for controlling a condition of a simulated medical treatment which is virtually carried out by an operator by using the simulated medical instrument while using the virtual model information and the medical information stored in the storage means with respect to the simulated medical treatment virtually executed by the operator, and notifying means for adding additional value information to information acquired by the control means to notify the resultant information to the operator.

According to a still further aspect of the present invention, there is provided a medical simulator notifying apparatus, wherein the notifying means includes simulated condition notifying means for notifying a condition of a medical treatment to be simulated to the operator in correspondence with an actual condition, and additional information notifying means for displaying additional information capable of helping one of a training, a learning, and an experiment of the simulated medical treatment, which does not correspond to the actual condition.

According to another aspect of the present invention, there is provided a medical simulator notifying apparatus, wherein the additional information notifying means is guideline notifying means for notifying a guideline for the simulated medical treatment which helps one of the training, the learning, and the experiment in the simulated medical treatment.

According to still another aspect of the present invention, there is provided a medical simulator notifying apparatus, wherein the additional information notifying means is risk predicting information notifying means for notifying a risky condition in one of the training, the learning, and the experiment in the simulated medical treatment.

According to a further aspect of the present invention, there is provided a medical simulator notifying apparatus, wherein the additional information notifying means is simulation time notifying means for notifying time spent to execute the simulated medical treatment.

According to a still further aspect of the present invention, there is provided a medical simulator notifying apparatus, wherein the additional information notifying means is evaluated result notifying means for notifying an evaluated result of the simulated medical treatment so as to help an own evaluation and/or an evaluation of another person as to one of the training, the learning, and the experiment of the simulated medical treatment.

BRIEF DESCRIPTION OF THE DRAWINGS

The above and further objects, novel features and advantages of the present invention will more fully become obvious by an understanding of the following detailed description to be read in connection with the accompanying drawings, in which:

FIG. 2 is a three-dimensional graphical shape information diagram for explaining a concrete structure of virtual model information;

FIG. 3 is an eyeball operation information diagram for describing a concrete structure of medical information;

FIG. 4 illustratively shows a simulated eyeball operation condition on a virtual space;

FIG. 11 illustratively indicates a simulated condition notifying means and a risk predicting information notifying means;

FIG. 12 a risk predicting information diagram for describing risky conditions occurred in cataract;

FIG. 13 is a diagram for indicating evaluated result notifying means;

FIG. 16 illustratively shows a display apparatus employed in the conventional medical simulator system.

DETAILED DESCRIPTION OF THE PREFERRED EMBODIMENT

First Embodiment

Figure 1:
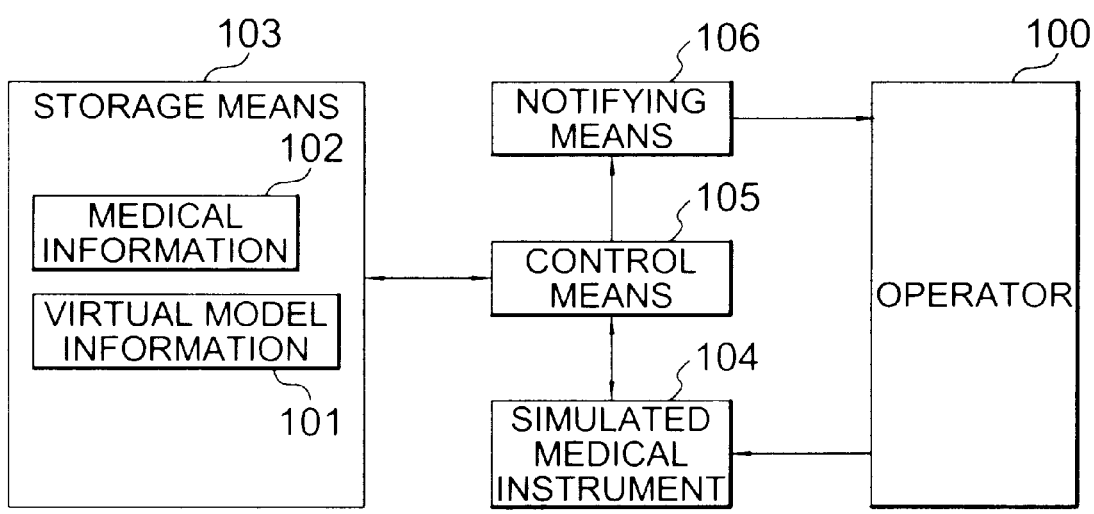
FIG. 1 schematically represents a basic arrangement of a medical simulator system according to a first embodiment of the present invention.

FIG. 1 schematically indicates a basic arrangement of a medical simulator system according to a first embodiment of the present invention.

In this drawing, reference numeral 100 shows an operator who operates this medical simulator system, reference numeral 101 indicates virtual model information for constituting virtually either a portion or an entire portion of a human body or an animal, and reference numeral 102 represents medical information related to medical treatments such as operations, examinations, and experiments. Also, reference numeral 103 shows a storage means for storing the above-described virtual model information 101 and medical information 102, reference numeral 104 represents a simulated medical instrument used in the medical treatments, reference numeral 105 shows a control means, and reference numeral 106 is a notifying means for notifying information acquired by the control means 105 to the operator. The control means 105 is used to grasp/control conditions of simulated medical treatments which are virtually performed with employment of the virtual model information 101 and the medical information 102 stored in the storage means 103 with respect to such medical treatments executed by the operator in the virtual manner using the simulated medical instrument.

Next, medical simulation by the above-explained medical simulator system will now be explained.

First, the operator 100 simulates a desired medical treatment by moving the simulated medical instrument 104 on the virtually constructed virtual model information 101. FIG. 2 is a three-dimensional graphical shape information diagram for explaining the concrete structures of the above-described virtual model information.

In FIG. 2, reference numeral 200 indicates three-dimensional (3D) graphical shape information about a human body or an animal, which is used to virtually constitute a partial shape or an entire shape of the human body or the animal. Also, reference numeral 201 shows 3D graphical shape information of simulated medical instrument, which is used to virtually constitute the shape of the simulated medical instrument by using three-dimensional graphics. Reference numeral 202 indicates a total number of vertexes for constituting each of the 3D graphical shape information. This information diagram represents that the shape information 200 is constituted by 1,000 vertexes, and the shape information 201 is constituted by 100 vertexes. Reference numeral 203 is the first vertex element for constituting each of the 3D graphic shape information. In this graphical shape information, the first vertex element is constituted by vertex coordinates (X1, Y1, Z1), normal vectors (L1, M1, N1) at the vertex, and color information (R1, G1, B1) at this vertex. It should be understood that the first vertex element 203 does not necessarily contain all of the above-explained information (namely, vertex coordinates, normal vectors, and color information), but also may furthermore contain additional information.

Reference numeral 204 represents a total number of planes for constituting each of the 3D graphical shape information. In this information diagram, the above shape information 200 is constituted by 4,000 surfaces and the other shape information 201 is constituted by 400 surfaces. Reference numeral 205 shows the first plane for constituting each of the 3D graphical shape information. This first plane indicates a triangle constructed of the first vertex coordinate, the second vertex coordinate, and the third vertex coordinate. It should be noted that the structure of the surface need not be a triangle. Generally speaking, a polygon is employed. Alternatively, either a circle or a sphere may be expressed by designating a center point and a radius. For the sake of simple explanations, the 3D graphical shape information is indicated to be constituted by the information about the vertexes and the surfaces. Alternatively, the 3D graphical shape information may contain additional value information such as a conversion matrix (rotation of article, and enlargement of article). Furthermore, while a color table is employed, desirable colors may be designated by a color table index. In addition, the 3D graphical shape information may be described by employing a set of point information called as volume data, instead of the information describing method by the surface data as shown in FIG. 2.

FIG. 3 is an eyeball operation information diagram for explaining the concrete structures of the medical information in the case of an operation on an eyeball as an example. In this drawing, reference numeral 300 is a symptom information diagram for describing symptom of a cataract patient in a simulated cataract operation, and reference numeral 301 is a condition change information diagram for describing a change in the symptom of the cataract patient with respect to simulated operation treatment in the simulated cataract operation. Based upon the symptom information 300 for the cataract patient shown in FIG. 3, it can be seen that this patient subjected to this simulated operation is suffering from cataract, and since the hardness of a nucleus lens is equal to grade 2, two hands method by "phaco" is suitable for this patient. Also, it is understood that since the nucleus lens owns the hardness of grade 2, if a force of 1.0 kg is applied to this nucleus lens, then this nucleus lens will be fragmented. In this simulated operation, parameters are set such that when a force larger than 1.0 kg is applied, the nucleus lens subdivision will occur.

On the other hand, it can be seen from the above-described condition change information 301 that bleeding occurs in conjunctiva incision and a bleeding amount is 1 ml/s. As a consequence, an increase in the bleeding amount in the simulated operation can be simulated. When the cornea is incised, a port is made, so that "phaco" can be inserted. Conversely, when the operator tries to insert "phaco" before the cornea is incised, there is such a risk that the cornea is wounded. These aspects may be recognized by the condition change information 301, and can be simulated in the simulated operation.

As an example of simulated medical treatment, there are conceivable, for example, a training of operation, a rehearsal of examination method, and an experiment of new operation technique. In this embodiment, a simulated cataract operation will now be explained as an example in order to explain conditions of simulated medical treatment by the operator 100 with employment of the simulated medical instrument 104. Since the operator 100 moves the simulated medical equipment 104 on the virtual model information 101, the positional information of this simulated medical equipment 104 on the virtual model information 101 is changed. This positional information change is transferred to the control means 105 by a position detecting mechanism such as a sensor and a motor installed in the stimulated medical equipment 104. The positional change of the simulated medical instrument 104 on the virtual model information 101 may be understood by, for example, a positional information acquiring method in which a sensor is mounted on a tip portion of a simulated operation instrument such as a simulated knife, and positional information is acquired by a 3D motion measuring apparatus, and also by such a positional information acquiring method that a rotation angle of a motor mounted on a kinesthetic sense presentation device called as a "haptics device" is measured, or a stretch distance of a string is measured.

As the concrete apparatuses, there are "PHANToM" manufactured/marketed by SensAble Technologies Inc.; "OPTO TRAK" manufactured/marketed by Northern Digital Inc.; "Haptic Master" researched by University of Tsukuba; and "SPIDAR" researched by Tokyo Institute of Technology. These conditions are entirely carried out on the virtual space. FIG. 4 visually represents the conditions of the simulated eyeball operation on the virtual space. Reference numeral 101 indicates the above-explained virtual model information, i.e., an eyeball model corresponding to a portion of a human body. Reference numeral 104 indicates the above-explained simulated medical instrument. A set of right/left medical instruments is prepared so as to simulate operations executed by the two hands method.

In this embodiment, the above-described virtual model information 101 and simulated medical instrument 104 are arranged by the 3D graphics data as indicated in FIG. 2. As a result, the contact detection between the eyeball model and the simulated medical instrument may be carried out by using the geometry. There is no change in the eyeball condition under such a condition that the simulated medical instrument is not made in contact with the eyeball model. However, when the simulated medical instrument is made in contact with the eyeball model and the operator executes a certain medical treatment, the condition of the eyeball is changed.

It is now assumed that the operator incises a portion of an eyeball model, namely a conjunctiva which constitutes a part of this eyeball model, while using a knife as the above-explained simulated medical instrument 104. As previously explained, it is possible to judge as to whether or not the knife is made in contact with the conjunctiva, by using the geometry. Concretely speaking, an equation defined between a plane and another plane, or another equation defined between a plane and a line segment is solved. When this equation can be solved, it is possible to judge that the knife is made in contact with the conjunctiva, whereas when this equation cannot be solved, it is possible to judge that the knife is not made in contact with the conjunctiva. If the knife is made in contact with the conjunctiva, then this conjunctiva will be incised, and the control means 105 recognizes that the condition of the simulated cataract operation is transferred to the conjunctiva incision. It is possible to grasp from the condition change information 301 how to change the condition of this operation by performing this conjunctiva incision. Based on the condition change information 301, it can be seen that bleeding occurs in connection with this conjunctiva incision. Also, it can be seen that the bleeding amount is equal to 1 ml/s, and this bleeding amount is continuously increased until a hemostasis treatment is carried out by using an electrocautery.

As another example, it is conceivable that a nucleus lens is destroyed by employing "phaco". A contact detection is made between "phaco" functioning as the simulated medical instrument 104 and the nucleus lens which constitutes a portion of the eyeball model. When this contact is detected and furthermore a force higher than a certain force is applied to this nucleus lens, this nucleus lens can be destroyed. In accordance with symptom information 300 of FIG. 3, the hardness of the nucleus lens is equal to the grade of 2. In the case that the hardness is equal to grade 2, when the force of 1.0 kg is applied to the nucleus lens, this nucleus lens can be destroyed. The control means 105 can execute the simulation of destroying this nucleus lens based upon the above-explained information.

The control means 105 corresponds to such a means capable of realizing a series of the above-explained process operations. In other words, the simulated medical treatment can be carried out as follows. Based upon the positional information notified from the simulated medical treatment 104, the contact detection calculation is carried out between the virtual model information 101 and the simulated medical instrument 104. Based upon this calculation result, the simulated medical treatment is performed with respect to the virtually set symptom by using the medical information 102. Furthermore, the notifying means 106 corresponds to such a means for notifying the information about the simulated medical treatment which can be recognized by the control means 105 to the operator 100 who executes the simulated medical treatment. As this notifying means, there are provided display means for performing a visual sense feedback, tactile sense presenting means for performing a feedback of either a kinesthetic sense or a hearing sense, and speech output means for performing a feedback of hearing. In this embodiment, the above-described notifying means 106 is realized by using the display means.

Figure 5:
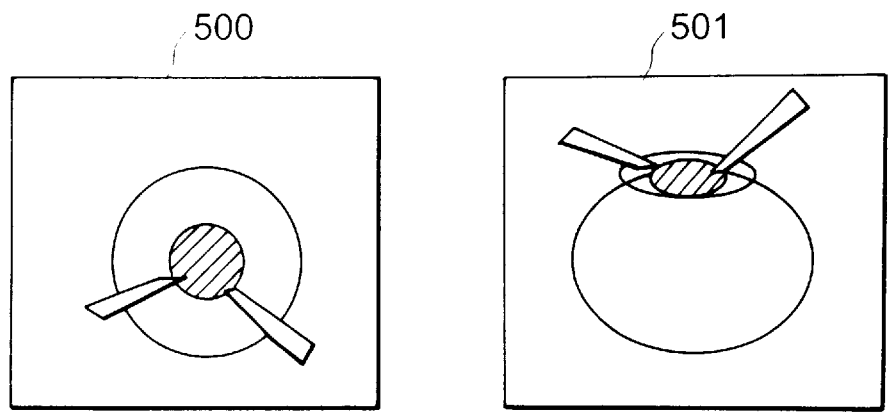
FIG. 5 illustratively indicates a diagram of a display means functioning as a notifying means.

FIG. 5 illustratively shows an example in the case that the display means is employed as the notifying means 106. Reference numeral 500 indicates a screen observed by an operator who executes a simulated medical treatment, and reference numeral 501 shows another screen observed by other persons except this operator.

Precisely speaking, reference numeral 500 is such an image that a condition of an eyeball operation is observed from the upper right-angled direction, namely a condition of an actual eyeball operation is simulated. On the other hand, reference numeral 501 shows such an image that the condition of the eyeball operation is observed in the transverse direction, which cannot be actually obtained from the real eyeball operation. This image can be seen from other persons except the operator may observe. Since only such an image 500 can be acquired in the actual operation, there is a risk that an operational instrument is made in contact with a posterior capsule portion of an eyeball to induce a damage of this posterior capsule in, for example, an eyeball operation. However, since an image capable of displaying a condition of an operation along a transverse direction is provided, a proper advice can be given to an operator while recognizing such a condition that a posterior capsule is destroyed. In the above-described first embodiment, while a plurality of display means are employed, a plurality of persons observe the separate images to acquire the different information, so that these persons can give various advices of operation training to each other. Apparently, it is also possible to provide plural sorts of information by switching plural images on a single display means. Also, while a single image, for example, only information acquired from the upper right-angled view is provided, the control means 105 may grasp the side viewed condition and may notify this grasped condition to the operator. As this notifying means in this alternative case, speech output means may be employed, or text information may be displayed on the image observed by the operator. Furthermore, while a single display means is commonly used by a plurality of operators, these plural operators may jointly perform the simulated medical treatment. This joint work may help a training of actual cooperative operation.

Moreover, even in such a case that any means other than the display means is used as the notifying means, for example, even when either the tactile sense presentation means or the speech output means is employed, either a single means or plural means may be conceived as this notifying means. When a single means is used, the medical treatment may be trained in the personal level. When a plurality of means are used, the medical treatment may be trained in the group level. When the group training is carried out, a plurality of the simulated medical instruments 104 are sometimes required. Apparently, it is conceivable that a plurality of means are required in the personal level. For example, both the display means and the tactile sense representing means may be employed, otherwise, both the hand tactile sense representing means and the foot tactile sense representing means may be employed.

As previously described, in this medical simulator system, such a physical model is not employed, which can represent a portion of a patient, or an overall part of this patient in the physical and spatial manner. A model for constituting a portion or an entire portion of a human body (otherwise animal) is virtually constituted by the virtual model information 101. For instance, since this virtual model information is saved in a storage medium such as a disk and a storage in a computer, such a physical model is not required. In the prior art described in U.S. Pat. No. 4,907,973, the model 51 is required to be constructed and the sensors must be mounted in this model 51 in order to acquire the positional information of the simulated endoscope 50. However, since the positional information of the simulated medical instrument 104 can be directly acquired from the position detecting mechanism such as the sensor and the motor provided in the simulated medical instrument 104 in the above-described medical simulator system, the model 51 doesn't have to be constructed. Since the model for constituting either a portion or an entire portion of the human body (or the animal) can be virtually constructed, such a physical model need not be manufactured.

Second Embodiment

In the above-described first embodiment, the medical simulator system employs the display means as the notifying means 105. In general, visually notifying means is well used as notifying means to an operator. However, according to the present invention, such display means is not necessarily required. In this second embodiment, notifying means other than display means is employed as the above-described notifying means.

Figure 6:
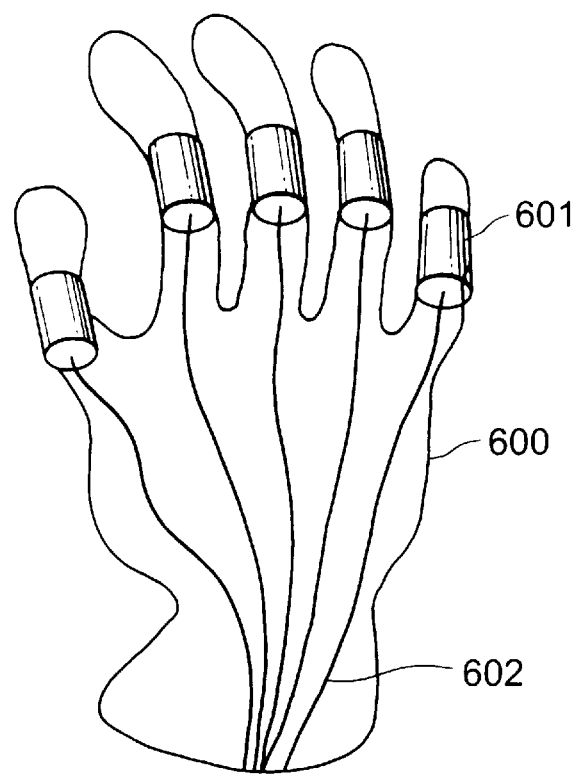
FIG. 6 is an illustration of a tactile sense presentation apparatus.

As a first example, the notifying means is realized by employing tactile sense representing means for performing a feedback of a tactile sense, or a kinesthetic sense. FIG. 6 is an illustration of this tactile sense representing means in a simulation manner. As this tactile sense representing means, for example, "Cyber Touch" manufactured/marketed by Virtual Technologies Inc. is employed. In this drawing, reference numeral 600 shows a glove, reference numeral 601 indicates a motor, and reference numeral 602 is a cable used to transmit control information of the motor. When the operator wears the glove 600 and hand-grips within the virtual space, a rotation angle of the motor 601 is transmitted via the cable 602 to the control means 105. In the control means 105, motion of a joint of each finger can be recognized from the rotation angle of the respective motors. When such a judgement is made by the control means 105 that either the kinesthetic sense or the tactile sense must be fed back in a certain simulated medical treatment, the control information used to produce either the kinesthetic sense or the tactile sense is transmitted via the cable 602 to the motor 601. The respective motors are rotated in response to the transmitted control information of the motors, so that either the kinesthetic sense or the tactile sense can be fed back to the operator. In this case, the tactile sense representing means may have both functions of the simulated medical instrument 104 and the notifying means 106.

As an example of the medical treatment, for example, a liver can be investigated. Normally, a lower edge of a normal liver is located at a right costal edge, or at a position slightly lower than this right costal edge. However, when the liver is hypertrophied, this liver is further enlarged along the lower direction. This phenomenon may be understood as possibilities of fulminate hepatitis and/or hepatomegaly.

Therefore, it is important to regularly diagnose a size of a liver by way of a touch diagnose.

This touch diagnose of a liver would require many experiences, namely very skilled medical treatments. Training with an actual patient is not the best solution. However, at present, training is carried out for actual patients while trainees are trained by experts. On the other hand, topographic images of human bodies can be imaged by using the presently available X-ray apparatus or the MRI apparatus. Since the image data acquired by these medical apparatuses are handled as volume data, the above-explained virtual model information 101 can be constituted.

Then, while using the medical information related to the liver, this virtual model information 101 is employed to be virtually diagnosed by using the simulated medical instrument 104, e.g., such tactile sense representing means as "Cyber Touch". As a result, the liver touch diagnose can be trained without actually touching the patient. As another example, a massage may be trained.

As previously explained, while using the tactile sense representing means capable of sensing the tactile sense as the notifying means, the medical treatment can be trained on the virtually constructed model information. In any of these training cases, the display means for performing the visual sense feedback is not always required, but the tactile sense representing apparatus capable of performing the tactile sense feedback may satisfy the sufficient condition.

In accordance with the research report issued from the PHANToM User's Group Workshop related to "PHANToM" manufactured/marketed by SensAble Technologies Inc., these tactile sense representing apparatuses can represent not only the kinesthetic sense and the tactile sense, but also the temperature sense. Accordingly, the temperature sense feedback capable of feeling by touching may be involved in this category.

Furthermore, it is also possible to report a simulated examination condition or the like by a speech. Also, the presently executed examination position, the condition of diseased portion, and furthermore the sequential process of this examination may be notified to the operator by the speech. The above information may be apparently notified by being included in the display means. Alternatively, in the case of a blind operator, the visual sense feedback is no longer required. In this case, any means other than the display means, namely either the tactile sense representing means or the speech output means may be employed to realize this notifying means. Furthermore, the speech output means may be employed so as to simulate sounds of an operation, or an instrument used in a medical treatment.

As previously described, the display means doesn't have to be always used as the notifying means 106, but this notifying means 106 may be realized by employing either the tactile sense representing means for feeding back the tactile sense, the kinesthetic sense, or the temperature sense, or the speech output means.

Third Embodiment

In the above-described the first and the second embodiments, a single medical treatment is simulated. In the following third embodiment, a single medical simulator system is equipped with a simulation operation selector, and, using this, a plurality of medical treatments may be simulated.

Figure 7:
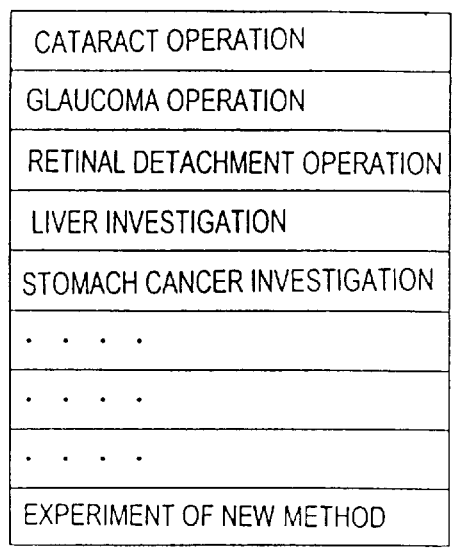
FIG. 7 is a diagram for representing a menu indicating a plurality of simulated medical treatment.

FIG. 7 is a menu for describing a plurality of simulated medical treatments, which is employed in a single medical simulator system. As previously explained, since the above-described virtual model information 101 is constructed in a virtual manner on storage means such as a storage or a disk of a computer, these virtual model information and medical information are substituted, so that a plurality of medical treatments can be simulated. In FIG. 7, there is shown a menu represented on a computer display. When one menu item of the medical information is selected by using a mouse or a keyboard, the corresponding information is read from the disk to be then stored in the storage. As a result, the selected medical treatment can be simulated. These treatment selecting methods may be realized not by using the mouse or the keyboard, but by way of the speech input, or the head tracking. Furthermore, the selected medical treatment need not be necessarily represented on the computer display. The selected menu may be read by a speech guide, or a hardware switch button may be prepared.

As previously explained, since the above-explained simulation operation selector is provided, a single simulation operation may be selected from the plural simulation operations in a single medical simulator system and thus various sorts of training may be realized.

In other words, a plurality of medical treatments can be simulated by the switching operation of selection by the simulation operation selector. Moreover, in accordance with the second embodiment, such an effective simulator system suitable for a blind, or a visually handicapped person may be constituted by employing properly selected notifying means.

Fourth Embodiment

Figure 8:
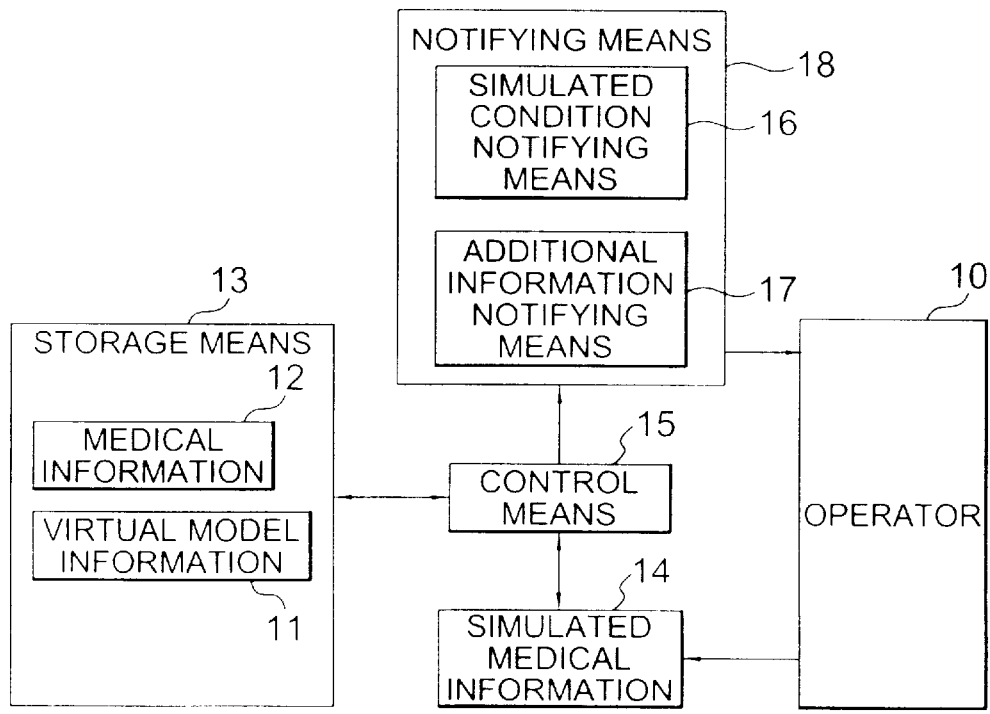
FIG. 8 schematically shows a basic arrangement of a medical simulator notifying apparatus.

FIG. 8 schematically indicates a basic arrangement of a medical simulator notifying apparatus.

In this drawing, reference numeral 10 shows an operator (user) who operates this medical simulator system, reference numeral 11 indicates virtual model information for virtually constituting either a portion or an entire portion of a human body or an animal, and reference numeral 12 represents medical information related to medical treatments such as operations, examinations, and experiments. Also, reference numeral 13 shows storage means for storing the above-described virtual model information 11 and the medical information 12, reference numeral 14 represents a simulated medical instrument used in the medical treatments, reference numeral 15 shows control means, and reference numeral 16 is simulated condition notifying means for notifying a condition of a medical treatment to be simulated to the operator in response to the actual condition, which is acquired by the control means 15. The control means 15 is used to grasp/control conditions of simulated medical treatments which are virtually performed with employment of the virtual model information 11 and the medical information 12 stored in the storage means 13 with respect to such medical treatments executed by the operator in the virtual manner with using the simulated medical instrument. Also, reference numeral 17 represents additional information notifying means for notifying additional information helpful of a training, a learning, or an experiment of a simulated medical treatment which dose does not correspond to the actual condition, and reference numeral 18 shows notifying means for covering both the simulated condition notifying means 16 and the additional information notifying means 17.

In this embodiment, the operator 10, virtual model information 11, medical information 12, storage means 13, and simulated medical instrument 14 each own the substantially same structures as those of the operator 100, virtual model information 101, medical information 102, storage means 103, and simulated medical instrument 104, and therefore are operated in a similar manner to those of the first embodiment.

Next, operation of the medical simulator notifying apparatus will now be described.

The notifying means 18 corresponds to such means for notifying the information of the simulated medical treatment recognized by the control means 15 to the operator 10 who executes the simulated medical treatment. This notifying means 18 is constituted by the simulated condition notifying means 16 for notifying the condition of the medical treatment to be simulated to the operator in response to the actual condition; and the additional information notifying means 17 for displaying additional information helpful of the training, the learning, or the experiment of the simulated medical treatment which does not correspond to the actual condition.

Figures 9, 10:
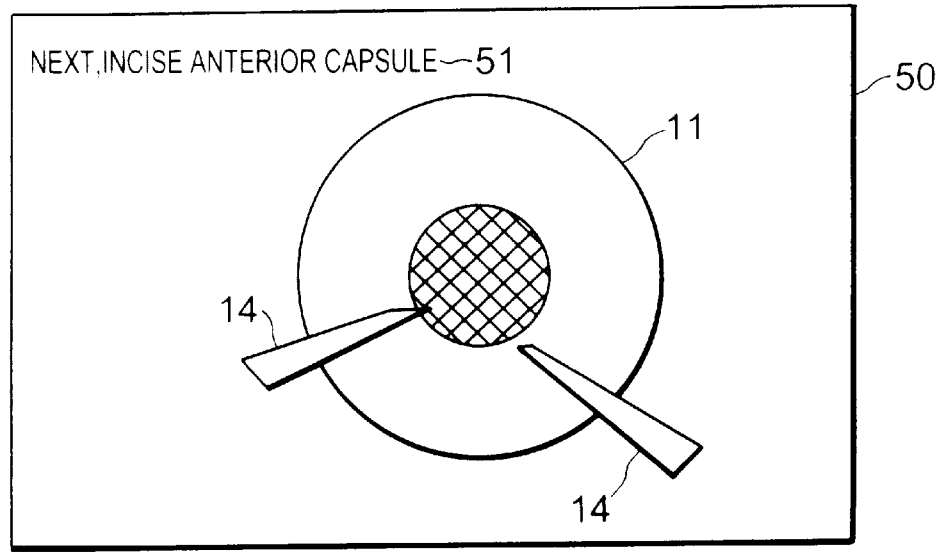
FIG. 9 illustratively indicates a simulated condition notifying means and a guideline notifying means.
FIG. 10 is a sequential diagram for explaining the procedure of simulated medical treatments used in the guideline notifying means.

FIG. 9 represents an example of the case that display means is employed as the notifying means, namely represents the simulated condition notifying means and the additional information notifying means. As this additional information notifying means, guideline notifying means is employed. Reference numeral 50 shows a screen observed by an operator who performs a simulated medical treatment. In this case, the image information acquired from the simulated condition notifying means 16 is especially displayed on this screen. Reference numeral 51 indicates text information acquired from the additional information notifying means 17. In this case, the additional information notifying means is realized as the guideline notifying means, and the text information of the acquired guideline is indicated as an example.

FIG. 10 represents a sequential operation of the simulated medical treatment used in the guideline notifying means. This guideline information corresponds to a portion of the above-explained medical information 12. Reference numeral 60 indicates an example of a cataract operation stage. In general, a cataract operation stage is arranged by (1) anesthesia, (2) eye speculum, and (3) conjunctiva incision in this order. As previously described, since the condition of the medical simulator is controlled by the control means 15, the present operation stage can be grasped by this control means. In the case of FIG. 5, since the control means 15 grasps such a fact that the cornea incision defined at the fifth stage is ended and the operational instrument is inserted, the guideline notifying means displays such a message "subsequently, incise an anterior capsule" in order to execute the sixth stage of anterior capsule incision as the next stage.

Normally, there are many possibilities that operators who carry out simulated medical treatments are beginners, and therefore, even when these beginners sufficiently study the medical treatments, they will often forget sequential operations in an actual medical treatment. As a consequence, since the guideline information is represented, even when the beginner forgets the sequential operation of the medical treatment, this beginner can train, learn, and execute an experiment of the relevant medical treatment by himself/herself without requiring any help.

Also, in this embodiment, the notifying means is realized by employing the display means for performing the visual sense feedback. However, this display means is not necessarily required. Alternatively, this notifying means may be realized by using tactile sense representing means for feeding back a tactile sense, or a kinesthetic sense, and/or speech output means for feeding back a hearing sense. In particular, in such a case that an operator is a visually handicapped person, such display means is not so effective. Alternatively, tactile sense representing means capable of representing a touch feeling, or speech output means capable of transferring a speech message may be preferably employed. Moreover, the same notifying means, for example, display means need not be used in the simulated condition notifying means 16 and the additional information notifying means 17. For example, while display means is employed in the simulated condition notifying means 16 so as to represent image information formed by computer graphics, the speech output means may be used in the additional information notifying means 17 so as to notify a guideline by way of speech.

As previously described, in the medical simulator notifying apparatus, when the medical treatments such as the operations, the examinations, and the experiments are simulated, the sequential operation of the simulated medical treatments is notified as the guideline to the operators. As a result, even when the operators are beginners, these beginners can effectively train, or learn the relevant medical treatments, or can effectively perform the experiments about these medical treatments. Also, the notifying means is not limited to the display means. Alternatively, either the tactile sense representing means or the speech output means may be employed. When these alternative means are combined with each other, the combined means may provide information helpful of the more effective simulated medical treatment with respect to such an operator as a visually handicapped person to which the simulated condition cannot be transferred by using the display means, or in such a case that the display means is not the effective notifying means.

Fifth Embodiment

In the above-described fourth embodiment, the medical simulator notifying apparatus is realized by employing the guideline notifying means as the above-explained additional information notifying means. Next, a description will now be made of a medical simulator notifying apparatus, according to this fifth embodiment, with employment of risk predicting information notifying means capable of notifying a risky condition in a simulated medical treatment as the additional information notifying means.

FIG. 11 is a diagram realized by employing the risk predicting information notifying means as the additional information notifying means, namely a diagram for representing simulated condition notifying means and the risk predicting information notifying means. In this drawing, reference numeral 71 is a message displayed by the risk predicting information notifying means, and other reference numerals shown in FIG. 11 are identical to those of FIG. 9.

Next, operation of the medical simulator notifying apparatus according to the fifth embodiment will now be explained.

As previously explained, display means is employed as the notifying means. However, this display means is not necessarily required. Alternatively, this notifying means may be realized by employing either the tactile sense representing means or the speech output means. FIG. 12 indicates risk predicting information on which risky conditions occurred in a cataract operation corresponding to a portion of the above-described medical information 12 is described. For instance, when a conjunctive incision is accompanied with bleeding. In this case, as apparent from FIG. 3, hemostasis must be carried out by using an electrocautery. Also, as apparent from FIG. 12, if the hemostasis is not carried out within 30 seconds, the eyeball is terribly wounded. In other words, in such a case that even when the hemostasis process is not performed by the operator even after 20 seconds have passed, for example, after the conjunctiva has been incised, it is predictable that the risky condition will occur. Therefore, such a message "immediately execute hemostasis treatment" may be displayed. As a consequence, the operator recognizes that the hemostasis treatment is the most important factor to be carried out under present condition, and thus, such a terrible wound of the eyeball can be avoided by carrying out the hemostasis treatment.

When the above-described bleeding occurs, since the display means is employed as the simulated condition notifying means, the operator can readily recognize the necessity of the hemostasis treatment. However, some operators cannot readily recognize the necessity of the respective medical treatments under the simulated conditions. For example, as apparent from FIG. 12, it can be seen that "if a medical instrument is unnecessarily approached to posterior capsule, posterior capsule damage may occur." However, the screen observed by the operator normally corresponds to such an image as viewed from the upper right-angled direction as shown in FIG. 11. Therefore, the operator cannot easily recognize the distance between the medical instrument and the posterior capsule. However, as previously explained, in the medical simulator system, the control means 15 grasps all of the conditions of these simulated medical treatments, and both the eyeball models and the medical instrument models are constructed as the three-dimensional graphics data as represented in FIG. 2. As a result, a cross point between a surface and another surface, and another cross point between a surface and a straight line are calculated. Also a contact judgement is carried out, or a distance between a cross point and a surface is calculated. As a consequence, for example, it is possible to calculate a distance from a tip portion of "phaco" (namely, a medical instrument) up to a posterior capsule (namely, rear portion of nucleus lens). As the result of this distance calculation, if the measured distance is shorter than, or equal to a constant value, then it is so judged that there is a risk, namely a damage of the posterior capsule. Thus, such a message "there is such a risk that a posterior capsule is damaged". This condition is indicated in FIG. 11. Reference numeral 71 is such a displayed image.

Since such three-dimensional graphics data don't exist in the actual medical treatment, the risk occurrence possibility cannot be notified while executing the cross point calculation and the distance calculation. However, the medical simulator system intends to correctly simulate the actual medical treatment, and furthermore to perform the training, the learning, and the experiment in order that operators never fail in the actual medical treatments. There is such a method that an operator actually makes a failure and can learn the reason of this failure as his experience, so that this operator never again makes such a failure. However, there is another method that an operator may grasp why a failure happens to occur under which condition. Then, in an actual medical treatment, when this operator encounters such a scene, he/she may remember the simulated training to avoid such a risk. The additional information notifying means may be switched on, if required. When this additional information notifying means is not required, this additional information is set to "no indication" state, or "no notification" state. In any cases, since the risk prediction information which could not be acquired during the actual medical treatment is notified, the medical treatments can be more effectively trained, studied, or can be carried out.

As previously explained, the additional information display means is realized as the risk predicting information notifying means, so that the risky condition can be predicted in advance. Thus, the training/learning/experiment of the desirable medical treatments can be completed without any failure. Also, since the risk predicting capability can be mastered, such a failure can be avoided in advance even in the actual medical treatment.

Sixth Embodiment

In the fifth embodiment, the additional information notifying means is realized by as the risk predicting information notifying means. In a medical simulator notifying apparatus according to this sixth embodiment, the above-described additional information notifying means is realized as evaluated result notifying means.

FIG. 13 is a diagram realized by employing evaluated result notifying means as additional information notifying means. In this drawing, reference numeral 90 shows an evaluation message obtained as the result of a simulated medical treatment displayed by the evaluated result notifying means. In this case, since the simulated medical treatment is ended, no information is notified from the simulated condition notifying means 16.

As indicated in FIG. 13, in this example, a cataract operation was carried out as the simulated medical treatment, and time spent on carrying out this simulated cataract operation was 50 minutes. Although there is no complication, since a crack is generated in an intraocular lens, it can be understood that the lens was required to keep at more higher temperature. The reason why such a crack was generated on the lens is considered as follows. The operation time of 50 minutes was spent, namely too long, and furthermore, the warmed lens was cooled. This information can be hardly obtained from the self-evaluation made by the operator. Accordingly, other persons' evaluations are normally required in the presence of experts. However, since such evaluated result notifying means by the computer is employed, the operator himself/herself can receive the evaluation results made by other persons even in the absence of such an expert. Also, the operator himself/herself can have satisfactory training while using his/her own sufficient time.

As previously described in detail, since the additional information notifying means is realized as the evaluated result notifying means, the operator himself/herself of this medical simulator system can obtain the evaluation results made by other persons even in the absence of the expert, and also the operator himself/herself can have his sufficient training, learning, or experiments.

Seventh Embodiment

In the above-described sixth embodiment, the additional information notifying means is realized as the evaluated result notifying means. Also, in each of the above-explained embodiments, single additional information notifying means is realized. Alternatively, a plurality of additional information notifying means are combined with each other to realize desirable additional information notifying means in this seventh embodiment. It should be noted that no specific explanation is made of simulation time notifying means in the above-described embodiment. Similar to either the guideline notifying means or the risk predicting information notifying means, elapsed time of a simulated medical treatment can be notified.

Figure 14:
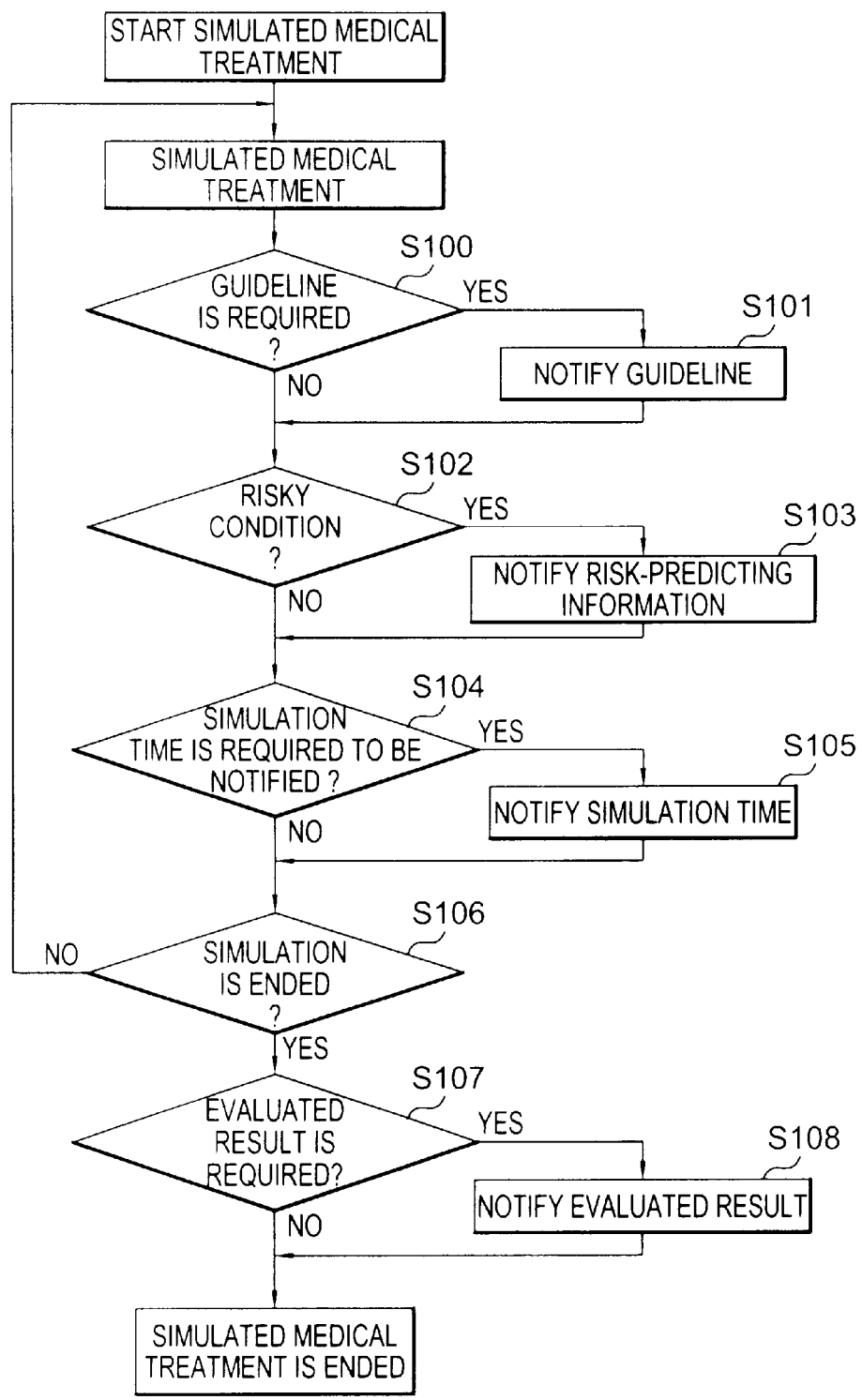
FIG. 14 is a flow chart for describing the medical simulation by the medical simulator system realized in combination with a plurality of additional information notifying means.
Figure 15:
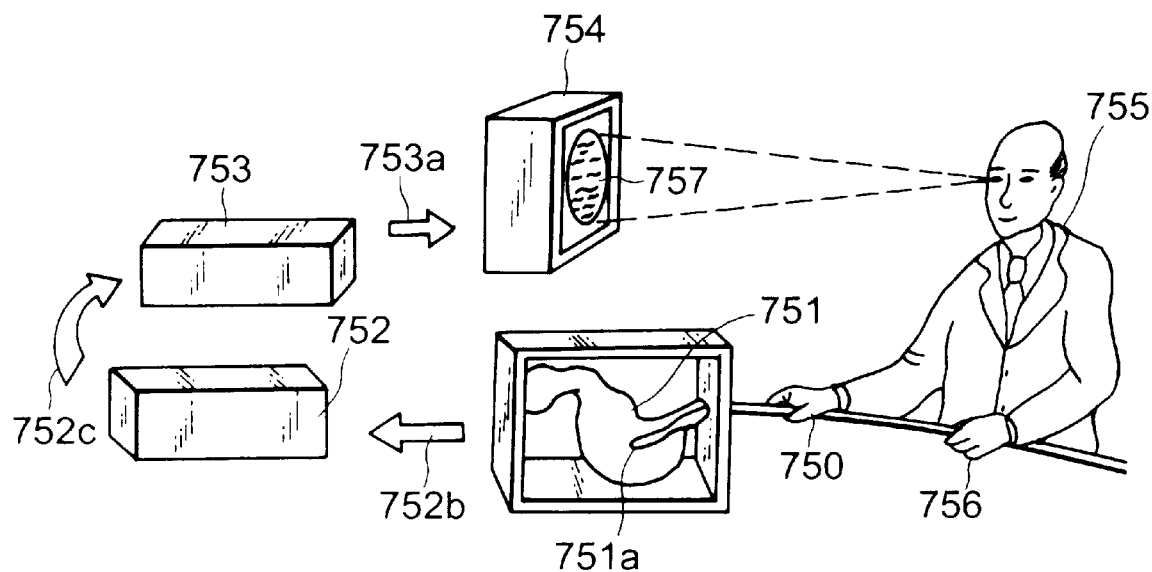
FIG. 15 schematically represents a conventional medical simulator system.

FIG. 14 is a flow chart for describing operations of a medical simulator system realized by combining a plurality of additional information notifying means. In this flow chart, symbol S100 indicates means for judging as to whether or not a guideline is required to be notified, symbol S101 represents guideline notifying means, and symbol S102 shows means for judging as to whether or not a risky condition occurs in a simulated medical treatment. Also, reference numeral S103 shows risk predicting information notifying means, and reference numeral S104 indicates means for judging as to whether or not simulation time is required to be notified. Furthermore, symbol S105 denotes simulation time notifying means, symbol S106 shows means for judging as to whether or not the simulated medical treatment is ended, symbol S107 indicates means for judging as to whether or not an evaluated result is required to be notified, and also symbol S108 indicates evaluated result notifying means.

Subsequently, operation of the medical simulator system will now be explained. When the operator 10 executes an operation on the virtual model information 11 by using the simulated medical instrument 14, a simulation of a certain medical treatment is commenced. In this simulated medical treatment, such a judgement as to whether or not a guideline is required to be notified is made as follows. For instance, before the simulated medical treatment is commenced, the guideline notification is set as an initial setting aspect to a "necessary" aspect. As a consequence, the control means 15 manages the conditions of the simulated operation. For example, in FIG. 10, when it is so judged that "conjunctive incision" is ended, the control means 15 may notify the next guideline "set control thread". Alternatively, the operator 10 may switch on the necessity of the guideline, if required, during the simulated medical treatment. This switching operation may be realized by, for example, manipulating a keyboard and a mouse, or by a speech input, or by operating a foot switch.

While the simulated medical treatment is advanced, possibilities where a risky condition occurs are increased. This condition can also be grasped by the control means 15. As an example, as previously described, when the tip portion of the simulated medical instrument is approached to the posterior capsule corresponding to the rear portion of the nucleus lens, such a message "there is a risk that posterior capsule is damaged" may be notified. Normally, the control means 15 judges as to whether or not a risky condition occurs. If there is no need to notify such risk predicting information, then the operator may set the notification of the risk notifying information to "unnecessary" state.

Also, the means for judging the necessity of notifying the simulation time may be realized in a similar manner to the means S100 for judging the necessity of the guideline. Next, when the simulated medical treatment is not yet ended, the operator 10 continues the simulated medical treatment, and then the necessary information is notified in accordance with the above-described flow chart. When the simulated medical treatment is ended, since the evaluated result is produced by the control means 15, this evaluated result is notified. It should also be noted that when it is so judged that the notification of this evaluated result need not be notified, no notification is made. Similar to the above-described manner, this notification of the necessity may be set at the initial setting operation before the simulated medical treatment is commenced. Alternatively, when the simulated medical treatment is ended, the control means may interrogate the operator 10 as to whether or not the notification is required.

As previously described, since the medical simulator system is realized by combining a plurality of additional information notifying means with each other, it is possible to notify a larger amount of more effective information which can help to simulate the medical treatments.

While the medical simulator system according to the present invention has been described in detail, since the model is virtually constituted, there is no need to manufacture the physical model. This virtual model constitutes a portion or an entire portion of a human body or an animal.

In accordance with the medical simulator notifying apparatus of the present invention, the additional information notifying means is provided in addition to the simulated condition notifying means capable of correctly simulating a certain selected medical treatment. Such sufficient information helpful of executing the training, learning, and experiment of the relevant medical treatment can be provided with the operator, depending upon the conditions.

What is claimed is:

1. A medical simulator system comprising:

storage means for storing thereinto virtual model information and medical information, said virtual model information virtually constituting one of a portion of a human body, an entire human body, a portion of an animal, and an overall animal, whereas said medical information being directed to a medical treatment selected from an operation, an examination, and an experiment;

a simulated medical instrument made by simulating a medical instrument used in said medical treatment;

control means for controlling a condition of a simulated medical treatment which is virtually carried out by an operator by using said simulated medical instrument while using said virtual model information and said medical information stored in said storage means with respect to said simulated medical treatment virtually executed by the operator; and notifying means for notifying information acquired by said control means to said operator.

2. The medical simulator system as claimed in claim 1 wherein:

said control means executes a contact detection between said virtual model information and said simulated medical instrument to thereby realize the simulated medical treatment in accordance with the result of said contact detection and said medical information.

3. The medical simulator system as claimed in claim 1 wherein:

said information stored in said storage means is constructed of:

three-dimensional graphical shape information of one of the human body and the animal, which virtually constitutes one of a partial shape of said human body, an overall shape thereof, a partial shape of said animal, and an overall shape thereof by using three-dimensional graphics;

three-dimensional graphical shape information of the simulated medical instrument, which virtually constitutes a shape of said simulated medical instrument by using three-dimensional graphics; and condition change information for describing both symptom information and a change in symptom; said symptom information describing symptom of one of said human body and said animal, which are treated as to said simulated medical treatment; and said change in the symptom occurring in the case that the simulated medical treatment is carried out with respect to one of said human body and said animal, which are treated as to said simulated medical treatment.

4. The medical simulator system as claimed in claim 1, further comprising:

a simulation operation selector for selecting a desired simulated medical treatment from a plurality of virtual simulated medical treatments.

5. The medical simulator system as claimed in claim 1 wherein:

said notifying means is a display means for performing a visual sense feedback.

6. The medical simulator system as claimed in claim 5 wherein:

said display means is constituted by a plurality of display means.

7. The medical simulator system as claimed in claim 1 wherein:

said notifying means is a tactile sense representing means for performing a tactile sense feedback.

8. The medical simulator system as claimed in claim 7 wherein:

said tactile sense representing means is constituted by a plurality of tactile sense representing means.

9. The medical simulator system as claimed in claim 1 wherein:

said notifying means is speech output means for performing a hearing feedback.

10. The medical simulator system as claimed in claim 9 wherein:

said speech output means is constituted by a plurality of speech output means.

11. The medical simulator system as claimed in claim 1 wherein:

said simulated medical instrument is constituted by plural sets of simulated medical instruments corresponding to a plurality of operators.

12. A medical simulator notifying apparatus comprising:

storage means for storing thereinto virtual model information and medical information, said virtual model information virtually constituting one of a portion of a human body, an entire human body, a portion of an animal, and an overall animal, whereas said medical information being directed to a medical treatment selected from an operation, an examination, and an experiment;

a simulated medical instrument made by simulating a medical instrument used in said medical treatment;

control means for controlling a condition of a simulated medical treatment which is virtually carried out by an operator by using said simulated medical instrument while using said virtual model information and said medical information stored in said storage means with respect to said simulated medical treatment virtually executed by the operator; and notifying means for adding additional value information to information acquired by said control means to notify the resultant information to said operator.

13. The medical simulator notifying apparatus as claimed in claim 12, wherein said notifying means includes:

simulated condition notifying means for notifying a condition of a medical treatment to be simulated to the operator in correspondence with an actual condition; and additional information notifying means for displaying additional information capable of helping one of a training, a learning, and an experiment of the simulated medical treatment, which does not correspond to the actual condition.

14. The medical simulator notifying apparatus as claimed in claim 13 wherein:

said additional information notifying means is guideline notifying means for notifying a guideline for said simulated medical treatment which helps one of the training, the learning, and the experiment in said simulated medical treatment.

15. The medical simulator notifying apparatus as claimed in claim 13 wherein:

said additional information notifying means is risk predicting information notifying means for notifying a risky condition in one of the training, the learning, and the experiment in said simulated medical treatment.

16. The medical simulator notifying apparatus as claimed in claim 13 wherein:

said additional information notifying means is simulation time notifying means for notifying time spent to execute said simulated medical treatment.

17. The medical simulator notifying apparatus as claimed in claim 13 wherein:

said additional information notifying means is evaluated result notifying means for notifying an evaluated result of said simulated medical treatment so as to help an own evaluation and/or an evaluation of another person as to one of the training, the learning, and the experiment of said simulated medical treatment.

* * * * *